US009389736B2

(12) United States Patent
Kim et al.

(10) Patent No.: US 9,389,736 B2
(45) Date of Patent: Jul. 12, 2016

(54) TOUCH SCREEN PANEL

(71) Applicant: Samsung Display Co., Ltd., Yongin, Gyeonggi-Do (KR)

(72) Inventors: Jung-Yun Kim, Yongin (KR); Mi-Ae Park, Yongin (KR)

(73) Assignee: Samsung Display Co., Ltd., Gyeonggi-Do (KR)

( * ) Notice: Subject to any disclaimer, the term of this patent is extended or adjusted under 35 U.S.C. 154(b) by 163 days.

(21) Appl. No.: 13/928,273

(22) Filed: Jun. 26, 2013

(65) Prior Publication Data

US 2014/0253473 A1    Sep. 11, 2014

(30) Foreign Application Priority Data

Mar. 5, 2013 (KR) .................. 10-2013-0023362

(51) Int. Cl.
  *G06F 3/041* (2006.01)
  *G06F 3/045* (2006.01)
  *G06F 3/044* (2006.01)
(52) U.S. Cl.
  CPC .............. *G06F 3/044* (2013.01); *G06F 3/0416* (2013.01)

(58) Field of Classification Search
  CPC ........ G06F 3/041; G06F 3/0416; G06F 3/044
  USPC .................................................. 345/173–175
  See application file for complete search history.

(56) References Cited

U.S. PATENT DOCUMENTS

| 8,125,463 | B2 | 2/2012 | Hotelling et al. | |
| 2009/0058825 | A1* | 3/2009 | Choi et al. | 345/173 |
| 2011/0227858 | A1* | 9/2011 | An et al. | 345/174 |
| 2012/0113046 | A1* | 5/2012 | Akira | 345/174 |

FOREIGN PATENT DOCUMENTS

| KR | 10-2009-0022597 A | 3/2009 |
| KR | 10-2010-0064268 A | 6/2010 |

* cited by examiner

*Primary Examiner* — Amit Chatly
(74) *Attorney, Agent, or Firm* — Knobbe, Martens, Olson & Bear, LLP

(57) ABSTRACT

A touch screen panel is disclosed. In one aspect, the touch screen panel includes a substrate divided into a display area and a non-display area positioned outside the display area, sensing lines in the display area and wiring lines in the non-display area. Each wiring line is connected to two or more sensing lines. The switching units are connected to the sensing lines and the wiring lines so as to selectively connect one of each of the sensing lines to each of the wiring lines.

8 Claims, 4 Drawing Sheets

TOUCH SCREEN PANEL

CROSS-REFERENCE TO RELATED APPLICATION

This application claims priority to and the benefit of Korean Patent Application No. 10-2013-0023362, filed on Mar. 5, 2013, in the Korean Intellectual Property Office, the entire content of which are incorporated herein by reference in their entirety.

BACKGROUND

1. Field

The described technology relates to a touch screen panel.

2. Description of the Related Technology

A touch screen panel is an input device capable of selecting content displayed on a screen by a human hand or an object.

The touch screen panel is formed on the front face of display. A touch screen works by converting a sensed contact into an electrical signal describing the location of the contact.

In the touch screen panel, sensing lines are used in a display area to determine the position of the object, e.g., a finger, contacting the screen.

SUMMARY OF CERTAIN INVENTIVE ASPECTS

One inventive aspect of the invention is the capability of creating a touch panel that has a smaller non-displaying area.

Another aspect is a touch screen panel with a display area and a non-display area, which is positioned outside the display area. The touch screen can also have sensing lines formed in the display area of the substrate, wiring lines formed in the non-display area, and switching units formed between the sensing lines and the wiring lines, to selectively connect one of the sensing lines to the wiring lines. The wiring lines can be connected to at least two sensing lines.

Another aspect is a touch screen panel with a controller configured: to control sensing signals, to drive the sensing lines, and sending a signal for controlling the switching units.

The switching units can be formed on both sides of the touch screen panel and can be adjacent to the sensing lines.

The switching units can include two transistors. The first transistor is between a first sensing line and a first wiring line. The second transistor is between a second sensing line adjacent to the first sensing line and the first wiring line.

In the switching units, the second transistor can be turned off while the first transistor is turned on or vice-versa.

Each of the transistors can include a source electrode, a drain electrode, and a gate electrode. The source electrode can be connected to one of the sensing lines, while the drain electrode is connected to one of the wiring lines and the gate electrode is configured to receive control signals from the controller.

The controller can sequentially transmit the sensing signals having predetermined voltage levels to the wiring lines a first gate signal to the first transistor connected to odd sensing lines, and a second gate signal obtained by inverting the first gate signal to the second transistor connected to even sensing lines.

In one embodiment, there can be fewer wiring lines than sensing lines.

The sensing lines can include a first set of sensing lines formed to be connected in a first direction and a second set of sensing lines formed to be connected in an intersecting crisscross direction.

The touch screen panel can include bridge patterns interconnecting the first set of sensing lines.

The touch screen panel can include an insulating layer interposed between the bridge patterns and connecting parts of the second set of sensing lines.

In one embodiment, at least two sensing lines, generally from the first set of sensing lines, and one wiring line are connected to each other. The switching units can be configured to selectively connect one of the sensing lines to the wiring lines.

DETAILED DESCRIPTION OF CERTAIN INVENTIVE EMBODIMENTS

Figure 1:
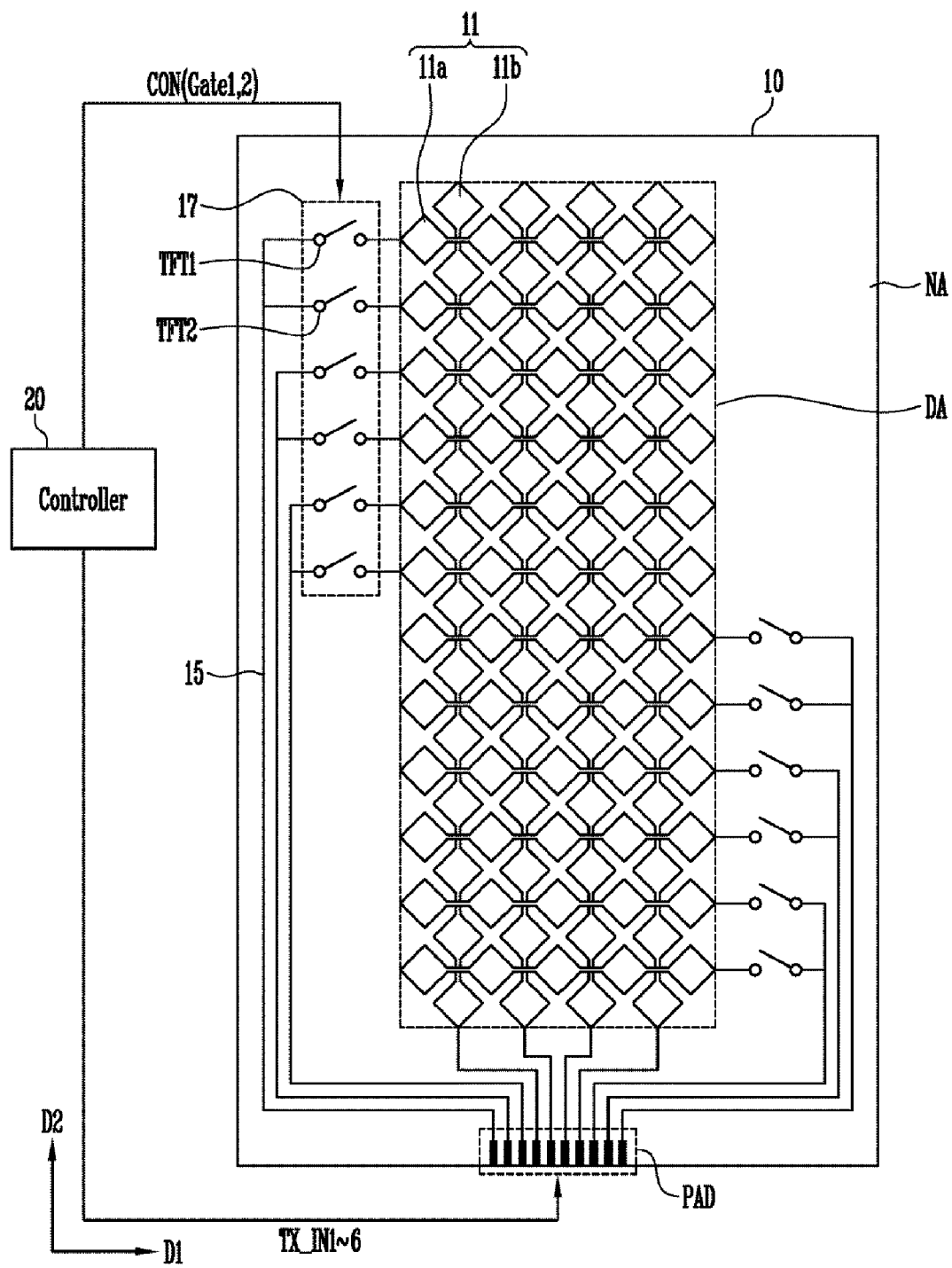
FIG. 1 is a plan view of a touch screen panel according to one embodiment.

Referring to the embodiment of FIG. 1, a touch screen panel includes a substrate 10. The substrate is divided into a display area DA and a non-display area NA. There are sensing lines 11 in the display area DA, wiring lines 15 in the non-active area NA, and switching units 17 between the sensing lines 11 and the wiring lines 15. In addition, the touch screen panel can also include a controller 20 configured to control the switching units 17.

The substrate 10 is be divided into the display area DA and a non-display area NA positioned outside the display area DA. In the display area DA, there are sensing lines 11. Wiring lines 15 are formed in the non-display NA area.

The substrate 10 is generally formed of a flexible and transparent material having high thermal and chemical resistance and can be a thin film substrate. The substrate can be formed from, polyethylene terephthalate (PET), polycarbonate (PC), acryl, polymethylmethacrylate (PMMA), triacetyl cellulose (TAC), polyethersulfone (PES), and polyimide (PI), among other materials.

The sensing lines 11 can include first set of sensing lines 11a and second set of sensing lines 11b arranged in the display area DA on the substrate 10. The sensing lines are connected to each other in different crisscrossing directions.

The first set of sensing lines 11a can be connected to each other in a first direction D1. The second set of sensing lines 11b can be arranged between the first set of sensing lines 11a and connected to each other in a second direction D2, which intersects the first direction D1. The first set of sensing lines 11a and the second set of sensing lines 11b are arranged to be connected in different directions. For example, the first set of sensing lines 11a can be connected in a row direction (a horizontal direction or D1) and can be connected to the wiring lines 15, respectively, in units of row lines. The second set of sensing lines 11a can be connected in a column direction (a vertical direction or D2) and can be connected to the wiring lines 15, respectively.

In one embodiment, the sensing lines 11 can be formed of a transparent electrode material such as indium tin oxide (ITO) to transmit light. The sensing lines 11 can be formed by depositing the conductive material on the substrate 10 and patterning the deposited conductive material by a photolithography method.

Methods used to detect a touch can include electro-capacitive, resistance layer, surface acoustic wave, or infrared methods. In one embodiment, the electro-capacitive touch screen panel senses a change in capacitance formed by a conductive sensing electrode with another sensing electrode or a ground electrode nearby when the human hand or the object contacts the touch screen panel to convert a contact position into an electrical signal.

In one embodiment, the first and second sets of sensing lines 11a and 11b are formed of the same material. The sensing lines can be arranged on one surface of the substrate 10 in the same layer in a diamond pattern. In other embodiments other materials, shapes and structures can be used with the invention.

In another embodiment, the first and second set of sensing lines 11a and 11b can be arranged in different layers in a linear stripe pattern. In another embodiment, the sensing lines 11 can be formed in a metal mesh pattern. The sensing lines 11 can be made of minute metal lines instead of by transparent conductive material. In still another embodiment, the first and second set of sensing lines 11a and 11b can be formed on both surfaces of the substrate 10, thus leaving the substrate 10 interposed.

The wiring lines 15 are configured to connect the first set of sensing lines 11a and the second set of sensing lines 11b to the external driving circuit in units of lines in the first and second directions D1 and D2. They can be connected to the first and second set of sensing lines 11a and 11b in units of row and column lines, respectively. Further, they can connect the first 11s and second set of sensing lines 11b to the external driving circuit such as a position detecting circuit (not shown) or the controller 20 through the pad unit PAD.

The wiring lines 15 can be arranged in the non-display area NA outside the touch screen panel to avoid the display area DA. The second set of sensing lines 11b can be connected to the pad unit PAD by wiring lines 15.

The width of a side of the non-display area NA in which the wiring lines 15 are positioned can be influenced by the number of wiring lines 15 and a width of the wiring lines.

For larger display panels, the size of the non-display area NA can be increased as the number of wiring lines 15 is increased.

In one embodiment, at least two sensing lines 11 and one wiring line are connected to each other and the switching units 17 configured to selectively connect one of the at least two sensing lines 11 to one of the wiring lines 15. This embodiment enables one to reduce the number of wiring lines 15 and to reduce the size of the non-display area NA.

One wiring line can be connected to the at least two sensing lines 11 forming groups in the touch screen panel.

Here, the switching units 17 are formed between the sensing lines 11 and the wiring lines 15 and selectively connects one of the sensing lines 11 to a wiring line.

For example, two adjacent first and second set of sensing lines among the sensing lines 11 can be connected to a first wiring line so that a first transistor TFT1 is formed between the first sensing line and the first wiring line and a second transistor TFT2 is formed between the second sensing line and the first wiring line.

In one embodiment, the two sensing lines 11 are connected to one wiring line 15, and the switching units 17 are made of transistors TFT. In other embodiments, the number of sensing lines 11 connected to one wiring line 15 and the type of the switching units 17 can vary.

To reduce the width of the side of the non-display area NA, the switching units 17 can be connected to the first set of sensing lines 11a. Alternatively, the switching units 17 can be connected to the second set of sensing lines 11b to perform the same function.

As a result, since there can be fewer wiring lines 15 than the sensing lines 11, the size of the non-display area NA can be reduced.

Considering that the switching units 17 are to be arranged in a partial area of the non-display area NA, the switching units 17 can be formed as close to the sensing lines 11 as possible.

The controller 20 outputs sensing signals for driving the sensing lines 11 and a control signal CON for controlling the switching units 17.

Figure 3:
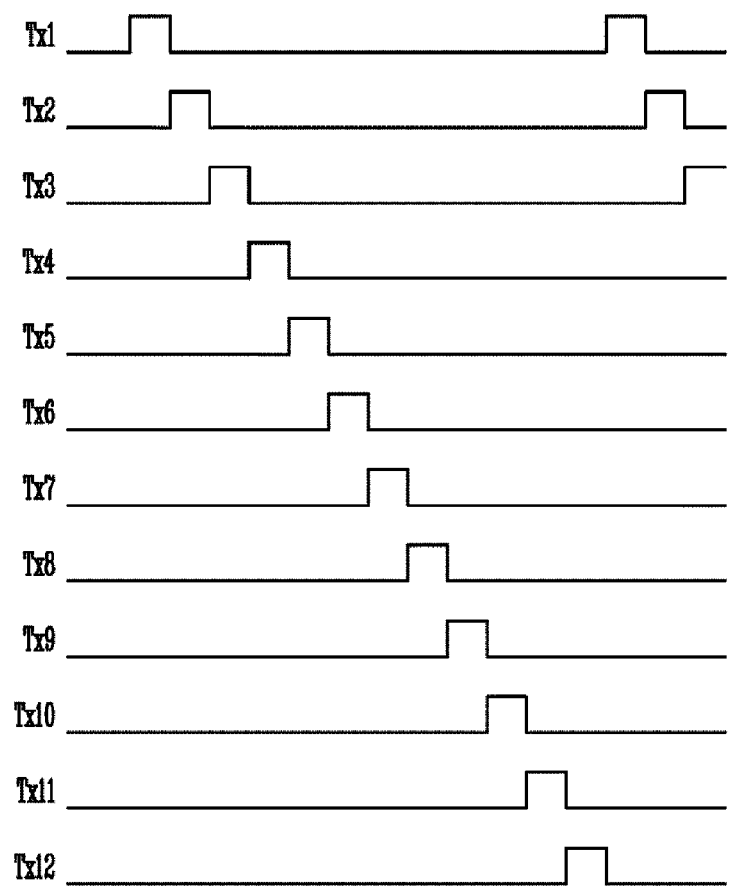
FIG. 3 is a timing diagram of sensing signals applied to first set sensing lines according to one embodiment.
Figure 4:
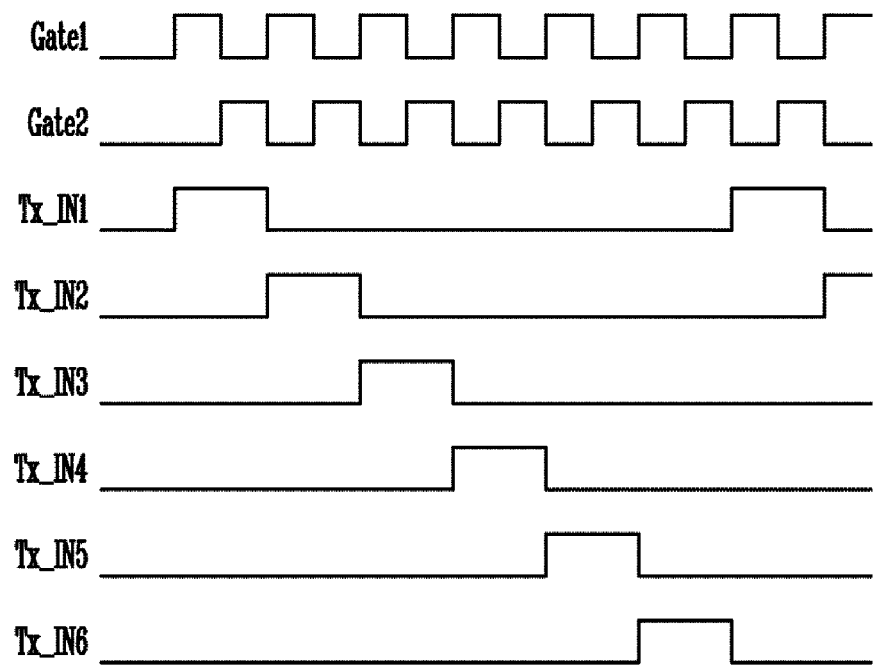
FIG. 4 is a timing diagram of control signals applied to switching units and sensing signals applied to wiring lines.

FIGS. 3 and 4 show the controlling of the switching units for one embodiment.

FIGS. 2A to 2D show sectional views of one method of manufacturing the touch screen panel of FIG. 1. Other methods can be used to make the touch screen panel.

Figure 2A:
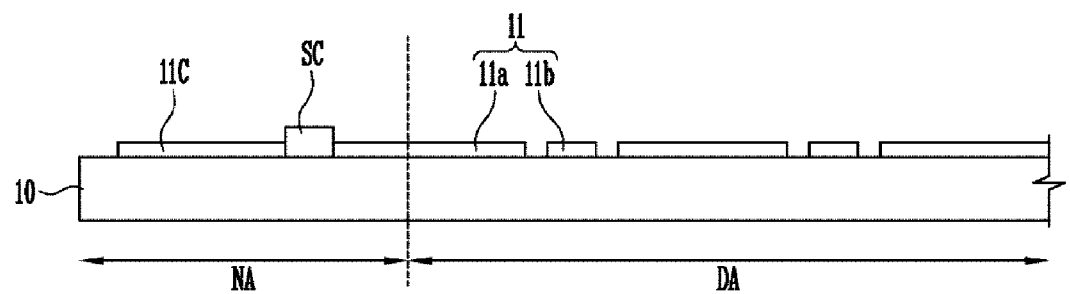
FIGS. 2A to 2D are sectional views describing how the touch screen panel of FIG. 1 can be manufactured.

FIG. 2A shows, the sensing lines 11 are formed in the display area DA of the substrate 10. The sensing lines 11 can be formed of a transparent electrode material such as ITO to transmit light and can be formed by depositing the conductive material on the substrate 10 and patterning the deposited conductive material by a photoresist method.

In the non-display area NA of the substrate 10, connecting patterns 11c for connecting the sensing lines 11, the transistor TFT, and the wiring lines 15 can be formed. The connecting patterns 11c can be formed of the same material as that of the sensing lines 11 in the same layer.

In addition, an organic semiconductor layer SC of which the transistor TFT are formed can be formed in a part of the non-display area NA.

Figure 2B:
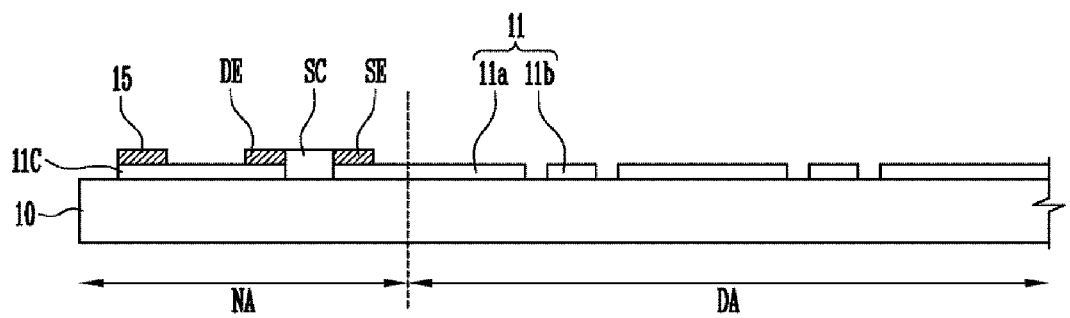

Referring to FIG. 2B, the wiring lines 15 and a drain electrode DE and a source electrode SE of the transistor TFT can be formed of the same material in the same layer.

Several embodiments allow for the wiring lines 15 and the transistors TFT to be formed in the non-display area. Because of this, one can choose from a wide variety of materials. One might select the materials to lower the resistance. Examples of materials one might use include Mo, Ag, Ti, Cu, Al, and Mo/Al/Mo. These can be used instead of the transparent electrode material used for forming the sensing electrodes 11, in certain embodiments.

Figure 2C:
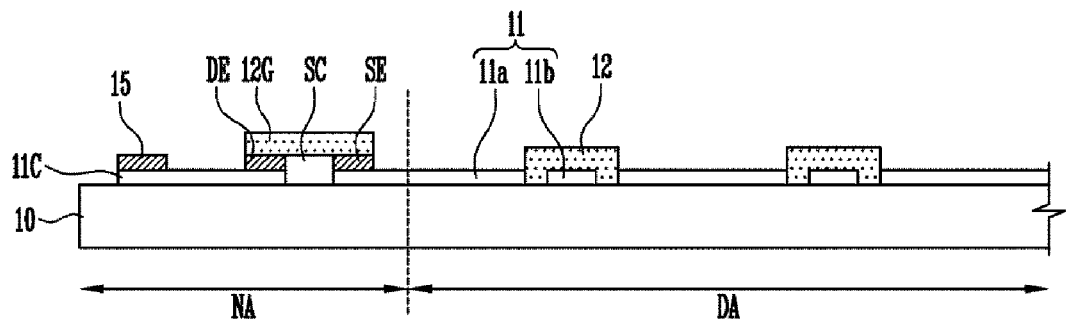

Referring to FIG. 2C, an insulating layer 12 and a gate insulating layer 12G can be formed of the same material and formed in the same layer.

The insulating layer 12 can be formed between the first set of sensing lines 11a and the second set of sensing lines 11b to electrically insulate both electrodes from each other. In addition, the insulating layer 12 insulates the second set of sensing lines 11b from bridge patterns 13.

Here, the insulating layer 12 can be formed in a partial area, that overlaps connecting parts of the sensing lines 11, and can be formed to cover an entire surface of the sensing lines 11. When the insulating layer 12 is formed to cover the entire surface, contact holes through which the first sensing line 11a and the bridge patterns 13 are connected to each other can be formed.

The gate insulating layer 12G is formed on the drain electrode DE and the source electrode SE of the transistor TFT. The gate insulating layer 12G insulates the drain electrode DE and the source electrode SE from a gate electrode GE.

Figure 2D:
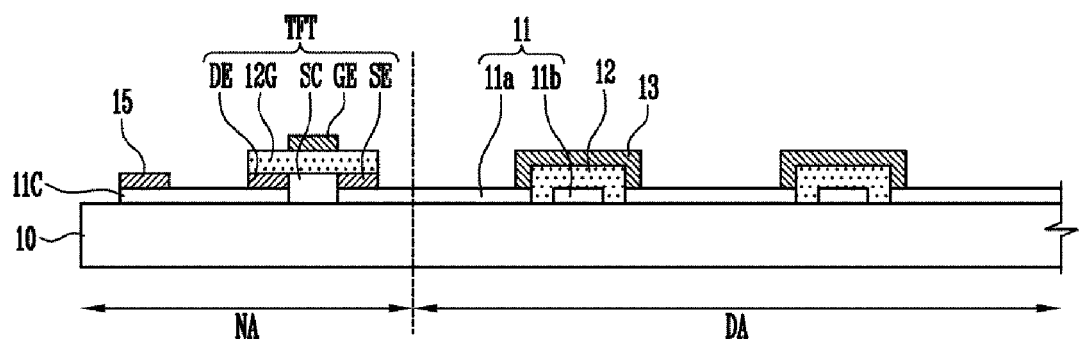

Referring to FIG. 2D, the bridge patterns 13 and the gate electrode GE can be formed of the same material in the same layer.

The bridge patterns 13 and the first set of sensing lines 11a can be in different layers and connected to each other. The bridge patterns 13 and the first set of sensing lines 11a can be in different layers, the bridge patterns 13 provided between the first set of sensing lines 11a and connected to the first set of sensing lines 11a and the first set of sensing lines 11a being connected to in the first direction by the bridge patterns 13.

The gate electrode GE is formed on the gate insulating layer 12G. The gate electrode GE is connected to the controller 20 to receive the gate control signal CON.

In the present embodiment, the switching units 17 include the transistor TFT, and the transistor TFT can be formed by a process of forming the sensing lines 11 and the wiring lines 15 without an additional process of forming the transistor TFT. Therefore, it is possible to simplify manufacturing processes and to improve productivity.

In one embodiment, a top gate structure in which the gate electrode GE is formed on a top is illustrated. However, in another embodiment, the transistor TFT can have a bottom gate structure in which the gate electrode GE is formed on a bottom.

For example, when the transistor TFT has the bottom gate structure, the sensing lines and the gate electrode of the transistor can be formed of the same material in the same layer. The bridge patterns, the source electrode, and the drain electrode of the transistor can be formed of the same material in the same layer.

FIG. 3 illustrates a timing diagram of sensing signals TX1 to TX12 applied to the first set of sensing lines 11a. FIG. 4 shows a timing diagram of control signals Gate1 and Gate2 applied to the switching units 17 and sensing signals Tx_IN1 to Tx_IN6 applied to the wiring lines 15.

In the one embodiment, the controller 20 sequentially transmits the sensing signals Tx_IN1 to Tx_IN6. The sensing signals have a predetermined voltage levels to the wiring lines 15. The controller transmits the first gate signal Gate1 to the first transistor TFT1 connected to odd sensing lines, and transmits the second gate signal Gate2 obtained by inverting the first gate signal Gate1 to the second transistor TFT2 connected to even sensing lines.

In FIG. 3, the sensing signals TX1 to TX12 are scanning signals sequentially applied to the first set of sensing lines 11a. When a sensing signal is applied to a first sensing line, the other sensing lines of first set of sensing lines are turned off. All of the sensing signals TX1 to TX12 are sequentially applied to the first set of sensing lines 11a.

FIG. 4 shows, the first set of sensing lines 11a are paired off to be connected to one wiring line. In this embodiment, the number of sensing lines in the first set of sensing lines is half the number of wiring lines they are connected to.

Therefore, the number of sensing signals Tx_IN1 to Tx_IN6 applied to the wiring lines 15 connected to the first set of sensing lines 11a is six, which is half of that of sensing signals TX1 to TX12 applied to the first set of sensing lines 11a.

In addition, one group includes two transistors TFT1 and TFT2, the number of control signals Gate1 and Gate2 applied to the switching units 17 is two.

As a result, the sensing signals TX1 to TX12 applied to the first set of sensing lines 11a are determined by the control signals Gate1 and Gate2 applied to the transistors TFT1 and TFT2 and the sensing signals Tx_IN1 to Tx_IN6 applied to the wiring lines 15.

One example is when both the Gate1 signal and the Tx_IN1 signal are ON, a Tx1 signal is sent to sensing lines.

When the second gate signal Gate2 is an inverted signal of the first gate signal Gate1, the second transistor TFT2 is OFF while the first transistor TFT1 is ON.

The touch screen panel sensing lines can be formed in a display area in which an image is displayed, so that a touch event generated in the display area is recognized as an input signal. On the other hand, a bezel area of the touch screen panel includes a non-display area outside the display area. In the non-display area, wiring lines connected to the sensing lines and a pad unit for connecting the sensing lines to an external driving circuit is formed.

In general, the wiring lines are extended from the sensing lines to the pad unit in a vertical (or D2) direction of the touch screen panel and a width of the non-display area in which the wiring lines are positioned are determined by the number of wiring lines and the width of the wiring lines.

When the number of sensing lines (or sensing channels) is increased as the touch screen panel is enlarged, since the number of wiring lines is increased, the size of the non-display area is also increased.

When the width of the wiring lines is reduced, the resistance is increased. By reducing the number of wiring lines needed, the width of the wiring lines can be increased, without increasing the width of a non-display area, thus improving the performance of the touch sensor.

In one embodiment, the touch screen panel can include a substrate, sensing lines, wiring lines, and switching units. The substrate can be divided between a display area DA and a non-display area NA positioned outside the display area. The sensing lines can be formed in the display area of the substrate. The wiring lines can be formed in the non-display NA area and be connected to at least two sensing lines. The switching units can be formed between the sensing lines and the wiring lines. This enables the wiring lines to be selectively connected to one of the two or more sensing lines.

The touch screen panel can further include an insulating layer interposed between the bridge patterns and connecting parts of the second set of sensing lines.

At least two sensing lines and one wiring line can be connected and the switching units can be configured to selectively connect one of the at least two sensing lines to the wiring lines. As such, there can be fewer wiring lines and the non-display area can be made smaller.

In addition, by forming the switching units using a thin film process, manufacturing can be simplified and yield rate can be improved.

One of ordinary skill in the art will fully appreciate that different combinations of disclosed options can result in different implementations of the intention.

Dimensions might have been exaggerated in the figures for clarity. Naturally, different dimensions can be used according to any given implementation.

Different embodiments have been disclosed herein. Different terms can be used to describe the above embodiments without departing from the scope of the invention. It would be apparent to one of ordinary skill in the art at the time of filing of the present application, features, characteristics, and/or elements described in connection with a particular embodiment can be used singly or in combination with features, characteristics, and/or elements described in connection with other embodiments. Accordingly, it will be understood by those of skill in the art that various changes in form and details can be made without departing from the spirit and scope of the present invention as set forth in the following claims.

What is claimed is:

1. A touch screen panel, comprising:
   a substrate divided into a display area and a non-display area outside the display area;
   a plurality of wiring lines in the non-display area, the wiring lines comprising a first group of wiring lines on a first side of the non-display area and a second group of wiring lines on a second side of the non-display area opposing to the first side;

a plurality of sensing lines in the display area, wherein for each wiring line, at least two sensing lines are in the display area;

a plurality of switching units between the sensing lines and the wiring lines to selectively connect one of the at least two sensing lines for each wiring line to each wiring line, the switching units comprising a first switching unit on the first side and a second switching unit on the second side, wherein each switching unit comprises: a first transistor connected between a first sensing line and a first wiring line; and a second transistor connected between a second sensing line that is adjacent to the first sensing line and the first wiring line, the first sensing line being an odd sensing line and the second sensing line being an even sensing line; and a controller configured to output sensing signals for driving the sensing lines and an output signal for controlling the switching units, wherein the first switching unit is connected to the first group and the second switching unit is connected to the second group, the first and second switching units being connected to different sensing lines to each other, and wherein the controller sequentially:

transmits one or more sensing signals having predetermined voltage levels to the wiring lines, and transmits a first gate signal to the first transistor, and transmits a second gate signal obtained by inverting the first gate signal to the second transistor.

2. The touch screen panel of claim 1, wherein the second transistor is turned off while the first transistor is turned on and the second transistor is turned on while the first transistor is turned off.

3. The touch screen panel of claim 1, wherein each of the transistors comprises: a source electrode connected to one of the sensing lines; a drain electrode connected to one of the wiring lines; and a gate electrode configured to receive the control signal from the controller.

4. The touch screen panel of claim 1, wherein there are more sensing lines than wiring lines.

5. The touch screen panel of claim 1, wherein the sensing lines are formed to be connected in a first direction, and further comprising other sensing lines that are formed to be connected in a second direction that intersects the first direction.

6. The touch screen panel of claim 1, further comprising
a first set of sensing lines and a second set of sensing lines;
a plurality of bridge patterns, wherein the bridge patterns and the first set of sensing lines are in different layers, and
wherein the bridge patterns intersect the second set of sensing lines and are connected to the first set of sensing lines.

7. The touch screen panel of claim 1, further comprising an insulating layer interposed between the bridge patterns and connecting parts of the second set of sensing lines.

8. The touch screen panel of claim 1, wherein for each wiring line, only two sensing lines are in the display area of the substrate.

* * * * *